(12) United States Patent
Chee et al.

(10) Patent No.: US 7,093,452 B2
(45) Date of Patent: Aug. 22, 2006

(54) AIR CONDITIONER

(75) Inventors: Hang Joon Chee, Singapore (SG); Sim Pin Quek, Singapore (SG); Valeri Gennadievich Khriachtchev, Moscow (RU); Alexandre Ivanovich Makienko, Moscow (RU); Valentine Alexandrovich Matveev, Moscow (RU); Iouri Ivanovich Krasnochtchekov, Moscow (RU)

(73) Assignee: ACMA Limited, Singapore (SG)

( * ) Notice: Subject to any disclaimer, the term of this patent is extended or adjusted under 35 U.S.C. 154(b) by 175 days.

(21) Appl. No.: 10/807,667

(22) Filed: Mar. 24, 2004

(65) Prior Publication Data

US 2005/0210908 A1   Sep. 29, 2005

(51) Int. Cl.
*F25B 7/00* (2006.01)
*F28D 5/00* (2006.01)

(52) U.S. Cl. ............................ 62/175; 62/305; 62/314

(58) Field of Classification Search .................. 62/175, 62/305, 314
See application file for complete search history.

(56) References Cited

U.S. PATENT DOCUMENTS

| | | | |
|---|---|---|---|
| 4,350,570 A | 9/1982 | Maisotsenko | |
| 4,827,733 A * | 5/1989 | Dinh | 62/305 |
| 4,832,115 A | 5/1989 | Albers et al. | |
| 4,842,052 A | 6/1989 | Gershuni et al. | |
| 4,905,479 A * | 3/1990 | Wilkinson | 62/271 |
| 4,971,245 A | 11/1990 | Maisotsenko et al. | |
| 4,976,113 A | 12/1990 | Gershuni et al. | |
| 4,976,824 A | 12/1990 | Lee | |
| 4,977,753 A | 12/1990 | Maisotsenko et al. | |
| 5,022,241 A * | 6/1991 | Wilkinson | 62/271 |
| 5,050,391 A | 9/1991 | Tsimerman | |
| 5,078,880 A | 1/1992 | Barry | |
| 5,301,518 A | 4/1994 | Morozov et al. | |
| 5,315,843 A | 5/1994 | Morozov et al. | |
| 5,453,223 A | 9/1995 | Maisotsenko | |
| 5,626,790 A | 5/1997 | Minor | |
| 5,660,048 A | 8/1997 | Belding et al. | |
| 5,718,848 A | 2/1998 | James | |

(Continued)

Primary Examiner—Marc Norman
Assistant Examiner—B. Clayton McCraw
(74) Attorney, Agent, or Firm—Hanley, Flight & Zimmerman, LLC

(57) ABSTRACT

The invention is an air conditioning unit 10 consisting of a housing 11 having at least one air inlet 21 for receiving air to be conditioned and at least one outlet 19 for discharging conditioned air, at least one fan 24 for moving air from the inlet 21 to the outlet 19, an air to air heat exchanger 26 of the type that cools the air by diverting and cooling a portion of the air through an evaporative cooling means, heat exchange occurring across a plurality of barriers 27 between the evaporatively cooled air and said incoming air, a vapor compression-type cooling system having an evaporator coil 54 through which the outlet stream of air passes for further cooling of the outlet air, a condenser coil 55 through which the evaporatively cooled air, stream that exits the air to air heat exchanger 26 passes, and a control system 60 that at least determines the temperature of the room 12 air and controls the operation of the air-conditioner to operate only the air to air heat exchanger 26 when the temperature is maintained below a pre-determined level, and operates both said air to air heat exchanger 26 and the vapor compression-type cooling system when the temperature increases above a pre-determined level.

Figure 1:
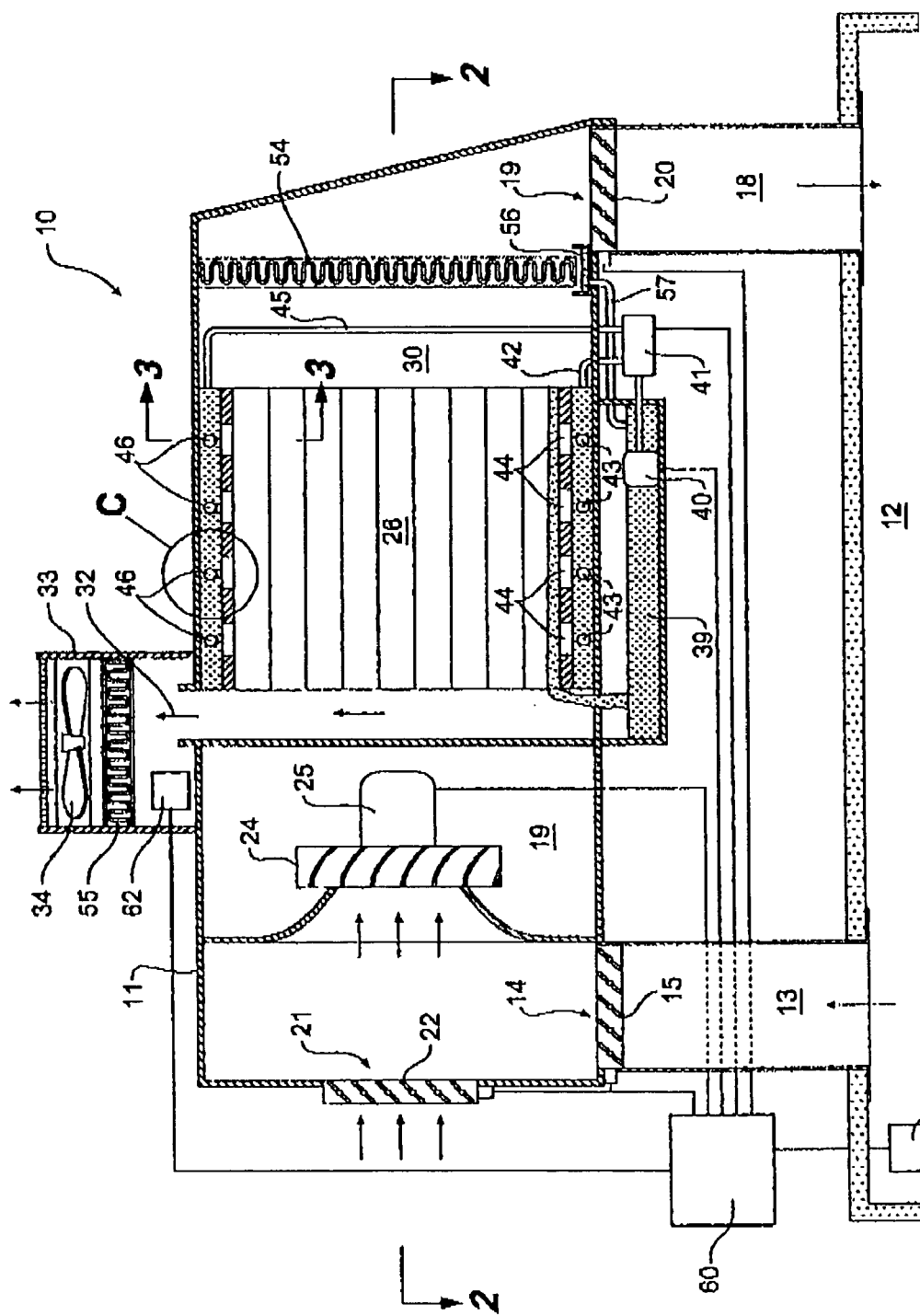

The advantage of the invention is that it has a seasonal power efficiency of two to three times greater by comparison to an air-conditioning system operating only with a vapor compression-type system.

17 Claims, 3 Drawing Sheets

U.S. PATENT DOCUMENTS

| | | |
|---|---|---|
| 5,727,394 A | 3/1998 | Belding et al. |
| 5,758,508 A | 6/1998 | Belding et al. |
| 5,800,595 A | 9/1998 | Wright |
| 5,812,423 A | 9/1998 | Maisotsenko et al. |
| 5,838,587 A | 11/1998 | Maisotsenko et al. |
| 5,860,284 A | 1/1999 | Goland et al. |
| 5,890,372 A | 4/1999 | Belding et al. |
| 5,932,074 A | 8/1999 | Hoiss |
| 6,003,327 A | 12/1999 | Belding et al. |
| 6,018,953 A | 2/2000 | Belding et al. |
| 6,050,100 A | 4/2000 | Belding et al. |
| 6,178,762 B1 | 1/2001 | Flax |
| 6,257,416 B1 | 7/2001 | Nussbaumer |
| 6,338,258 B1 | 1/2002 | Lee et al. |
| 6,494,053 B1 * | 12/2002 | Forkosh et al. ............... 62/271 |
| 6,497,107 B1 | 12/2002 | Maisotsenko et al. |
| 6,581,402 B1 | 6/2003 | Maisotsenko et al. |
| 6,698,218 B1 * | 3/2004 | Goth et al. .................. 62/175 |
| 6,705,096 B1 | 3/2004 | Maisotsenko et al. |
| 6,751,966 B1 * | 6/2004 | Viegas et al. ................ 62/131 |
| 6,776,001 B1 | 8/2004 | Maisotsenko et al. |
| 6,779,351 B1 | 8/2004 | Maisotsenko et al. |
| 6,848,265 B1 | 2/2005 | Lowenstein et al. |
| 6,854,278 B1 | 2/2005 | Maisotsenko et al. |
| 6,866,203 B1 | 3/2005 | Messmer et al. |
| 6,911,121 B1 | 6/2005 | Beckman |
| 6,945,061 B1 * | 9/2005 | Nosaka ....................... 62/175 |
| 2002/0038552 A1 | 4/2002 | Maisotsenko et al. |
| 2002/0056029 A1 | 5/2002 | Marui |
| 2002/0073718 A1 | 6/2002 | Maisotsenko et al. |
| 2002/0134094 A1 * | 9/2002 | Huh et al. .................... 62/175 |
| 2003/0014983 A1 | 1/2003 | Maisotsenko et al. |
| 2003/0033821 A1 | 2/2003 | Maisotsenko et al. |
| 2003/0126876 A1 | 7/2003 | Maisotsenko et al. |
| 2003/0145609 A1 | 8/2003 | Maisotsenko et al. |
| 2003/0177771 A1 | 9/2003 | Maisotsenko et al. |
| 2003/0209017 A1 | 11/2003 | Maisotsenko et al. |
| 2004/0061245 A1 | 4/2004 | Maisotsenko et al. |
| 2004/0103637 A1 | 6/2004 | Maisotsenko et al. |
| 2004/0244398 A1 | 12/2004 | Radermacher et al. |

* cited by examiner

AIR CONDITIONER

This invention relates to an air-conditioner, and in particular to an air-conditioner incorporating a combination of an air to air heat exchanger with conventional vapour compression-type cooling system.

Conventional air-conditioning systems, particularly for domestic and commercial room cooling application normally comprise either evaporative air-conditioning systems or refrigerant vapour compression-type systems. Evaporative air-conditioning systems normally use evaporation of water by air to absorb heat from the air. Such systems obviously do not work well in humid climates.

Vapour compression-type systems provide effective heating and cooling across a wide range of ambient air conditions. They still function in humid climates and act to de-humidify air that is being cooled. However, their efficiency and cost of running is considerably higher by comparison to evaporative cooling systems.

Air to air heat exchanges are not generally used or well-known in relation to air-conditioning systems. Such air heat exchangers normally use some form of plate-type heat exchanger that has two flow paths for two separate air streams, one of which is being cooled. Such a system is described in the applicant's earlier U.S. Pat. No. 5,301,518. This specification shows air flow channels where heat is transferred through walls between adjacent channels. In this specification, air to be cooled flows through dry channels and a portion of that air is diverted as it exits the dry channels to flow through the intervening wet channels. The diversion is caused through adjusting back pressure between the outlet for the conditioned air and the outlet from the wet channels.

The wet channels incorporate a wet media which creates the evaporative cooling.

Although this design represents a compact and efficient evaporative cooling system, it nonetheless is not suited to high humidity conditions.

Therefore, it is an object of this invention to provide an air-conditioning unit that has the advantage of operating over a greater range of humidity while at the same time providing the most cost-effective and efficient cooling for different levels of humidity.

In one form, the invention is an air-conditioner unit consisting of:
a housing having at least one air inlet for receiving the air to be conditioned and at least one outlet for discharging the conditioned air,
at least one fan for moving air from said inlet to said outlet,
an air to air heat exchanger of the type that cools said air by diverting and cooling a portion of said air through an evaporative cooling means, heat exchange occurring across a plurality of barriers between said evaporatively cooled air and said incoming air, a vapour compression-type cooling system having,
an evaporator coil through which said outlet stream of air passes to cause further cooling of said outlet air,
a condenser coil through which said evaporatively cooled air stream exits said air to air heat exchanger passes, and
a control system that at least determines the temperature of the room air and controls the operation of said air-conditioner to operate only said air to air heat exchanger when said room air temperature is maintained below a pre-determined level, and operates both said air to air heat exchanger and vapour compression-type cooling system when the room air temperature is above said pre-determined level.

The advantage of the invention according to the above description is that, in the case of relatively dry air, then cost effective and efficient evaporative cooling can be utilised without the need for operating the vapour compression cooling system. However, when the moisture content increases, to a point where evaporative cooling is no longer sufficient, then together with the evaporative cooling system, the vapour compression system can operate so that the required cooling can be achieved.

The housing may comprise any number of containers or cabinets but also the air-conditioning unit may be installed within ducting or incorporated within a plant room. Any arrangement that would allow for the inlet of outside air, provide an outlet for exhaust air from the air to air heat exchanger and have an outlet for air from the unit would meet the definition of "a housing".

The fan may comprise any convenient air handling device such as an axial or centrifugal flow fan. In addition, more than one fan may be used to create the required air flow.

Any form of air to air heat exchanger that creates heat transferred between the two air streams would meet the requirement of the invention. Preferably though, the heat exchanger is a counter-flow air to air heat exchanger using alternating, intervening partitions between the two air streams.

The evaporative cooling means may comprise a number of means of incorporating moisture into one of the air flows within the air to air heat exchanger. For example, moistened wicking pads may be used or there may be a direct water spray into the air flow channel. Alternatively, a combination of water sprinkling or spray combined with a wicking material may also be used.

The vapour compression-type cooling system is of the type that utilises a refrigerant gas that is compressible and that condenses to a liquid form under pressure. Heat from the compressed gas is removed via a condenser coil. The condensed liquid passes through an expansion valve and the evaporation which occurs in the evaporator coil results in cooling of the coil and air that passes through. Gas from the evaporator coil then passes to the inlet side of the compressor which begins the cycle again.

Preferably, the housing has both an outside air inlet as well as an inlet from the conditioned space. Each of the inlets may also have flow control means which enables each of the inlets to be opened, closed or partially open. The inlet from the conditioned space can be closed when the evaporative system is operating so that 100 percent outside air is used. In the combined operation of the air to air heat exchanger and vapour compression system, the majority of the air flow can be from the conditioned space with a smaller percentage of outside air.

Preferably, a water tank is provided for water to be supplied to the air to air heat exchanger. A pump and distribution piping may be used to direct the water supply to the required location. Preferably, condensate is drained from the evaporator coil into the water tank.

The air outlet from the air-conditioning unit may be provided with a flow control device that, together with a further fan associated with the exhaust air exit from the air to air heat exchanger, is used to control air via back pressure that is diverted into the secondary cooling channels of the air to air heat exchanger.

A preferred embodiment of the invention will now be described, but it should be realised that the invention is not restricted to the precise combination of features shown in this embodiment. Further, other modifications and variations such as would be apparent to a skilled addressee are deemed within the scope of the present invention.

Figure 2:
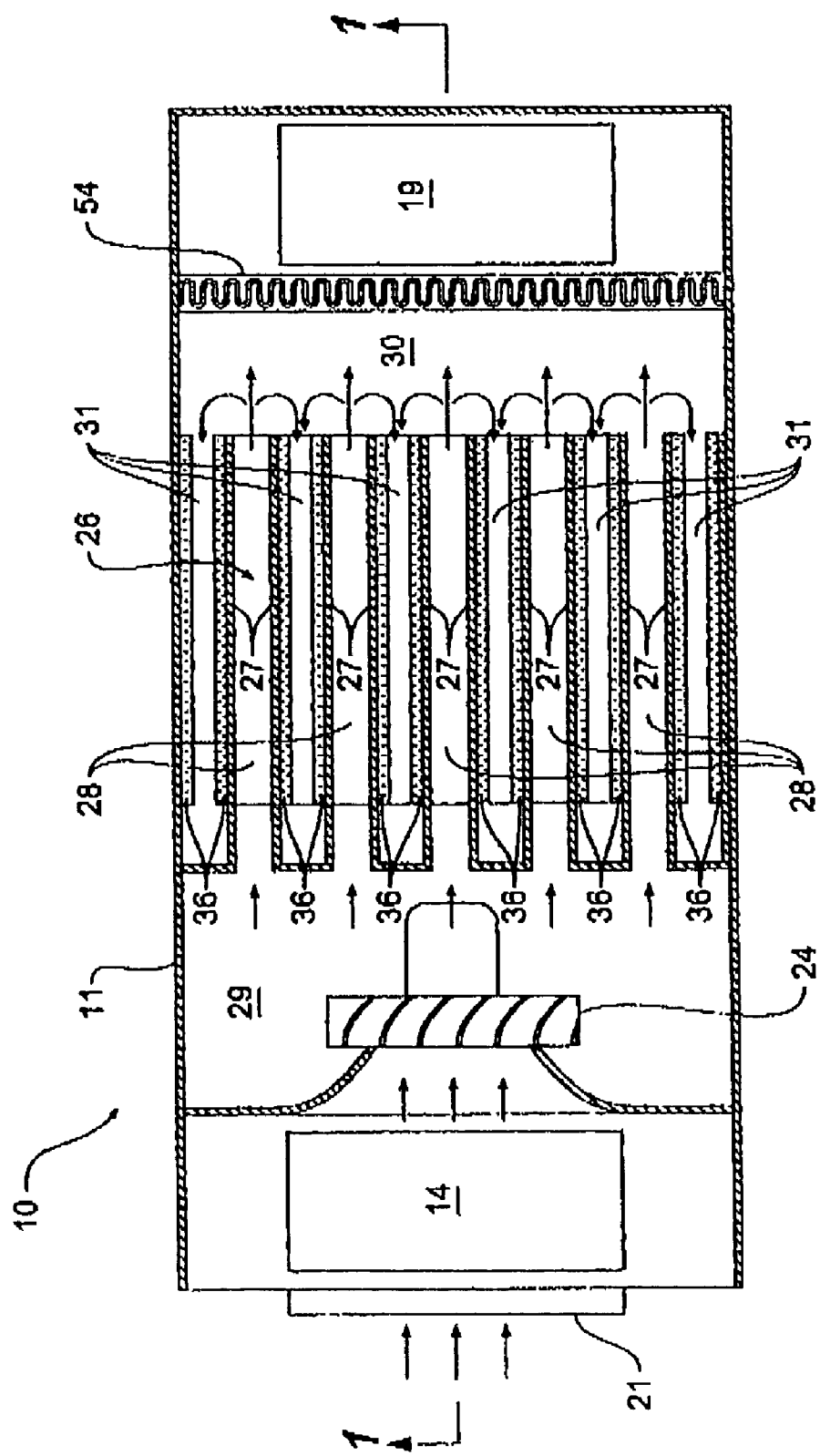
Figure 3:
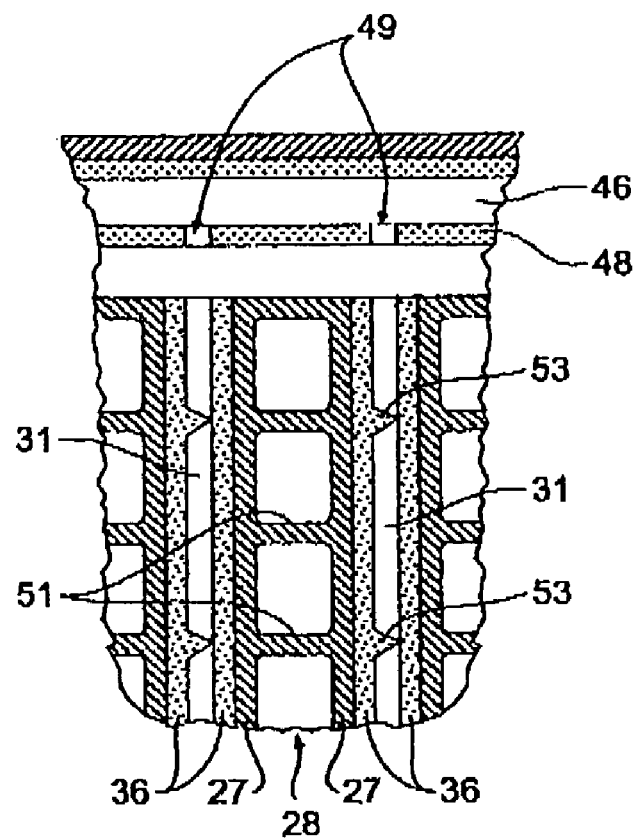
Figure 4:
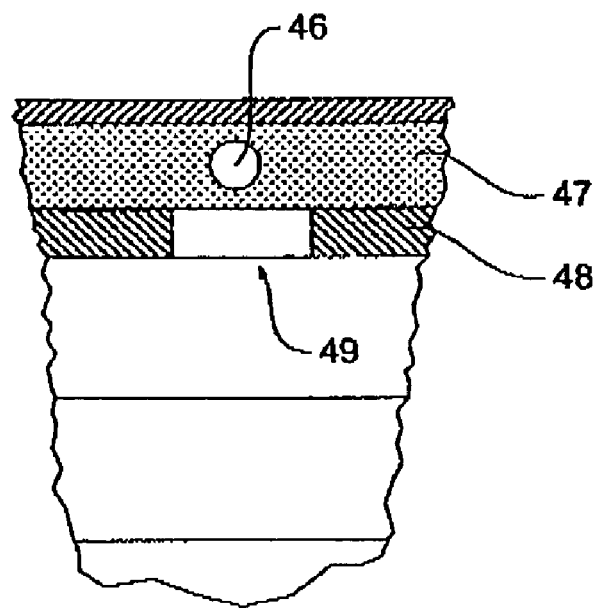

The preferred embodiment is illustrated in the accompanying drawings in which:

FIG. 1 shows a side cross-section view of an air-conditioning unit along section line 1—1 shown in FIG. 2, FIG. 2 shows a plan cross-section view of an air-conditioning unit along section line 2—2 shown in FIG. 1, FIG. 3 shows a partial section view of the air to air heat exchanger along section lines 3—3 shown in FIG. 1, and FIG. 4 shows a partial sectional view of the top portion of the air to air heat exchanger as defined by the region C shown in FIG. 1.

The air-conditioning unit 10 comprises a housing 11 that is mounted externally of a room 12 that is to be air-conditioned. A return air duct 13 connects to the room 12 with the air-conditioning unit 10 via an inlet 14. A flow control means is located across the inlet 14 which comprises a rotatable blade damper 15 that can control air flow from a fully opened position to a fully closed position. An inlet air duct 18 connects the outlet 19 from the air-conditioning unit 10 to the room 12. An air flow control means comprising movable blade damper is located across the outlet 19 and is used to control the air flow through the duct 18.

Outside air is drawn in through inlet 21. Movable blade damper 22 is located across the inlet 21. Fan 24 is used to move air through the air-conditioning unit 10. In this embodiment, the fan 24 comprises an axial flow fan driven by an electric motor 25.

The housing 11 is a sheet metal construction combined with insulating material on its external surface. The air-conditioning unit 10 can be mounted on the roof of the room 12 that is to be air-conditioned, as shown in FIG. 1, but alternatively may be mounted to a wall of the room 12.

The air to air heat exchanger 26 is located within the housing 11 and is positioned between the fan 24 and outlet 19. The air to air heat exchanger is best seen in FIG. 2 and comprises a number of spaced vertical partitions 27 which create air flow channels. The first channels 28 are open at either end (with reference to FIG. 2) and allow air flow from the fan chamber 29 to a distribution chamber 30. The second air channels 31 are alternately spaced between the first channels 28 and are open at their ends adjacent the discharge end of the first channels 28 within the distribution chamber 30. A portion of the air exiting the first channels 28 is diverted into the second channels 31. The ends of the second channels 31 are closed and exhaust air from the second channels 31 is discharged vertically through openings 32 in the upper portion of the closed ends of the second channels 31 that discharge the exhaust air into exhaust air housing 33. A second fan 34 discharges the exhaust air to atmosphere.

The sides of the partitions 27 within the second channels 31 are lined with a porous material 36 that is designed to, through capillary action, wick water from the lower edge of the porous material 36 throughout the length of the material 36 to its upper edge.

Air that flows through the second channels 31 is evaporatively cooled which results in a significant temperature reduction within the second channels 31. This in turn has the effect of cooling the air passing through the first channels 28 due to its contact with partitions 27 which transfer heat from the first channels 28 to the second channels 31.

The damper 20 is used to create sufficient back pressure so that a portion of the air leaving the first channels 28 will be diverted into the second channels 31. The positive pressure created by fan 34 will also assist in causing this diversion.

A water tank 39 sits below the air to air heat exchanger 26. A pump 40 pumps water from the water tank 39 via a two-way valve 41 and conduit 42 into a series of header tubes 43 that are in the lower portion of the air to air heat exchanger 26. The header tubes 43 have openings 44 in the base of each second channel 31. A number of openings are spaced along the length of each second channel 31. The water flow is sufficient to flood the base of each second channel 31 so as to fully wet the porous material 36. The wicking properties of the porous material 36 cause it to be moistened from the base to the top of each second channel 31.

Excess water from the header tubes 43 is discharged at the end of each second channel 31 and flows back into the water tank 39. The movement of air through the second channels 31 assists in moving the water along the second channels 31 so it is discharged at their ends.

A second water conduit 45 extends from the two way valve 41 to the top of the air to air heat exchanger 26 and connects with header tubes 46 that open into each of the second channels 31. The detail of the header tubes 46 as shown in FIG. 4 which show a tube 46 imbedded within a resin material 47 above a top plate 48. The top plate 48 sits above both the first and second channels 28 and 31 and has elongate slots 49 that open up into the second channels 31.

Water diverted to the top of the air to air heat exchanger 26 via a second conduit 45 is used to flush water from the top of each porous sheet 36 to the bottom. This helps in dissolving and removing any salts or deposits that may accumulate over time.

FIG. 3 shows the construction that forms both the first and second channels 28 and 31. The first channel members 28 comprise partition walls 27 that are bridged via a plurality of longitudinal walls 51 that are spaced evenly vertically along each first channel 28 and that extend for the full length of each channel 28. The use of the longitudinal walls 51 increase the surface area to enable greater heat transfer for the air moving through the first channels 28. The structure comprising the partitions 27 and longitudinal walls 51 can be fabricated and manufactured from the number of materials, but preferably comprise extruded polymeric material or extruded aluminium.

The second channels 31 are formed between adjacent partitions 27 and have porous material 36 in sheet form adhered to each side of second channel 31. One or both of the panels of porous material 36 may be provided with longitudinal ridges 53 to maintain separation between the porous sheet material 36 on each side of the second channel 31.

Air travelling through the second channels is cooled due to evaporation which in turn causes cooling of the partitions 27. This results in cooling of the air travelling through the first channels 28.

The invention also includes a vapour compression-type cooling system. FIG. 1 shows an evaporator coil 54 located downstream of the air to air heat exchanger 26. Air exiting the first channels 28 that is not diverted into the second channels 31 passes through the evaporated coil 54 before leaving the outlet 19. It also includes a condenser coil 55 which is located in the exhaust air housing 33. The exhaust air from the second channels 31 pass through the condenser coil 55 before being discharged to atmosphere by fan 34.

For simplicity, other componentry associated with vapour compression-type cooling system are not shown in FIG. 1 or 2 but will be readily understood by a person skilled in the art. These components include the thermal expansion valve and associated pipe work and the compressor 62 is shown schematically.

A drain 56 is located below the evaporated coil 54 and connects to the water tank 39 by conduit 57. This allows any moisture that condenses on the evaporator coil to drain into the water tank 39 of the air to air heat exchanger 26. The use of such condensate is desirable since it will minimise dissolved salts that might otherwise be introduced into the water tank 39.

A control system 60 is used to activate operation of various components of the air-conditioning unit 10. Thermostat 61 senses the room 12 temperature. The control system 60 also operates the pump 40 and two-way valve 41. It controls operation of the fan motor 25 and dampers 15, 21 and 20. It also control operation of compressor 62.

Operation of the air-conditioning unit 10 will now be described. During the dry season or when the moisture content in the atmosphere does not exceed 9 g/kg, then only the air to air heat exchanger 26 is operated. In this case, damper 15 is fully closed and damper 22 is fully opened so that 100 percent outside air enters the air-conditioning unit 10. The pump 40 is turned on so that water is pumped into the base of the second channels 31. The fan 24 operates to blow air through the air to air heat exchanger and as discussed above, air is diverted through the second channels to cool the air passing through the first channels 28. Cooled air exiting the first channels 28 that is not diverted into the second channels 31 passes through outlet 19 into the rooms 12. The diverted air in the second channels 31 exhausts through openings 32 into the exhaust air housing 33 whereupon it is discharged to atmosphere.

The damper 21 either by itself, or in combination with fan 34, may be adjusted to provide the optimal proportion of diverted air into the second channels 31. Preferably, the diverted air stream constitutes approximately one third of the total air entering the air to air heat exchanger 26.

During the dry season or when the outside air moisture content is below 9 g/kg, the air to air heat exchange 26 is sufficient to provide adequate indoor room 12 cooling without the need to operate the vapour compression-type cooling system. However, at the increase of humidity the net cooling capacity of the air to air heat exchanger 26 reduces and the indoor air temperature increases. Thermostat 61 senses the increased temperature and causes the control system to operate compressor 62 to start the vapour compression-type cooling system. The air flow from the air to air heat exchanger 26 that passes through the evaporator coil 54 is further cooled and dried prior to entering the room 12. At the same time, damper 20 is adjusted by the control system 60 so that approximately 25 to 35 percent of air is diverted into the second channels 31.

With the vapour compression-type cooling system turned on, and as the humidity increases, so the percentage of outside air entering through damper 21 is reduced. The biggest use of capacity of the vapour compression system will be consumed in reducing the moisture content (drying) of the air stream passing through the evaporator 54. This leads to reduction of cooling capacity and therefore an increase in the room 12 temperature. Thermostat 61 will cause the control system 60 to adjust dampers 21 and 15 so that the percentage of outside air drawn through the fan 24 will continue to reduce from 100 percent to as low as 20 to 30 percent. This will occur as the outside air humidity continues to increase above 9 g/kg to high humidity levels where only 20 to 30 percent of outside air is used. A gradual increase of room air drawn through the return air duct 13 as the humidity increases will maintain the room 12 moisture content at 9 to 10 g/kg which will be lower than the outside air humidity levels. This will mean that the air to air heat exchanger 26 will still generate a useful cooling effect.

During start-up of the air-conditioning unit in high humidity conditions, the controller 60 will operate the air to air heat exchanger only for a brief period of time to establish the need for the use of the vapour compression-type cooling system. This time is adjustable and will depend on the normal time taken for the air to air heat exchanger 26 to reduce the temperature in the room 12.

The air to air heat exchanger 26 utilising evaporative cooling in combination with the vapour compression-type pulling system results in an air-conditioning unit 10 that allows an increase in the seasonal power efficiency of two to three times by comparison to an air-conditioning unit operating using only a vapour compression-type system. Accordingly, when outside humidity levels allow, adequate cooling can be provided through using only the air to air heat exchanger 26 without the need to run the less efficient vapour compression-type cooling system. On those occasions where there is an increase in the humidity of the outside air, then the air-conditioning unit 10 will still provide adequate cooling by way of the vapour compression-type cooling system working in combination with the air to air heat exchanger 26.

Further, the installation of the condenser coil 55 within the exhaust air housing 33 increases the cooling capacity of the vapour compression-type system due to the exhaust air flowing from the second channels 31 having a reduced temperature by comparison to outside air. For example, with an outside temperature of 40 C, the combination of 25 percent outside air with return air from the room 12 (at a temperature of approximately 27 C) when mixed will have a temperature of approximately 30 C. This will be further cooled upon passage through the second channels 31 to approximately 27 C. This will be the temperature of the exhaust air passing through the condenser coil 55 which will significantly increase the efficiency of the vapour compression-type system by comparison to the use of outside air alone at a temperature of 40 C.

The apparatus as described allows for air-conditioning in climatic regions that have a wide range of humidity variation over the cooling season. The system allows an increased seasonal energy efficiency of two to three times by comparison to using only the vapour compression-type systems.

What is claimed is:

1. An air-conditioner unit comprising:
    a housing having at least one air inlet for receiving air to be conditioned and at least one outlet for discharging conditioned air into a room,
    at least one fan for moving air from said inlet to said outlet,
    an air to air heat exchanger to cool said air by diverting and cooling a portion of said air through an evaporative cooling means to form evaporatively cooled, diverted air, heat exchange occurring across a plurality of barriers between said evaporatively cooled, diverted air and said air moving from said inlet to form an outlet stream of cooled air,
    a vapour compression-type cooling system having:
        an evaporator coil through which the outlet stream of cooled air passes for further cooling said outlet stream of cooled air, a condenser coil through which said evaporatively cooled, diverted air exiting said air to air heat exchanger passes, and a control system that at least determines the temperature of the room air and controls the operation of said air-conditioner to operate only said air to air heat exchanger when said room air temperature is maintained below a pre-determined level and operates both said air to air heat exchanger and said vapour compression type cooling system when the room air temperature is above said pre-determined level, wherein the at least one air inlet comprises a first air inlet receiving outside air and a second air inlet receiving air from the conditioned space, said air from said first and second inlets being mixed prior to entering said air to air heat exchanger.

2. An air-conditioner according to claim 1 further comprising air flow control means on both said first and second inlets to at least partially open or close to control air flow through said inlets, said air flow control means being operated by said control system.

3. An air-conditioner according to claim 2 wherein said air flow control means on said second air inlet is closed when only said air to air heat exchanger is operating.

4. An air-conditioner according to claim 2 wherein said air flow control means on said first air inlet is partially opened to allow between 20 to 30 percent of total air flow through said first air inlet, and said air flow control means on said second air inlet is partially opened to allow the balance of the total air flow through said second air inlet.

5. An air-conditioner unit comprising:
a housing having at least one air inlet for receiving air to be conditioned and at least one outlet for discharging conditioned air into a room,
at least one fan for moving air from said inlet to said outlet,
an air to air heat exchanger to cool said air by diverting and cooling a portion of said air through an evaporative cooling means to form evaporatively cooled, diverted air, heat exchange occurring across a plurality of barriers between said evaporatively cooled, diverted air and said air moving from said inlet to form an outlet stream of cooled air,
a vapour compression-type cooling system having:
an evaporator coil through which the outlet stream of cooled air passes for further cooling said outlet stream of cooled air,
a condenser coil through which said evaporatively cooled, diverted air exiting said air to air heat exchanger passes,
a control system that at least determines the temperature of the room air and controls the operation of said air-conditioner to operate only said air to air heat exchanger when said room air temperature is maintained below a pre-determined level and operates both said air to air heat exchanger and said vapour compression type cooling system when the room air temperature is above said pre-determined level,
a water tank for supplying water to said air to air heat exchanger, and
a condensate collector on said evaporator coil that drains into said water tank.

6. An air-conditioner unit comprising:
a housing having at least one air inlet for receiving air to be conditioned and at least one outlet for discharging conditioned air into a room,
at least one fan for moving air from said inlet to said outlet,
an air to air heat exchanger to cool said air by diverting and cooling a portion of said air through an evaporative cooling means to form evaporatively cooled, diverted air, heat exchange occurring across a plurality of barriers between said evaporatively cooled, diverted air and said air moving from said inlet to form an outlet stream of cooled air,
a vapour compression-type cooling system having:
an evaporator coil through which the outlet stream of cooled air passes for further cooling said outlet stream of cooled air,
a condenser coil through which said evaporatively cooled, diverted air exiting said air to air heat exchanger passes,
a control system that at least determines the temperature of the room air and controls the operation of said air-conditioner to operate only said air to air heat exchanger when said room air temperature is maintained below a pre-determined level and operates both said air to air heat exchanger and said vapour compression type cooling system when the room air temperature is above said pre-determined level,
a water tank for supplying water to said air to air heat exchanger, wherein said evaporative cooling means of said air to air heat exchanger comprises a plurality of wicking members located within a plurality of air flow channels and wherein water from said water tank is supplied to the base of each said wicking member, and
a secondary water supply that directs water from said water tank to the top of each said wicking member to provide a flushing flow down each said wicking member.

7. An air-conditioner unit comprising:
a housing having at least one air inlet for receiving air to be conditioned and at least one air conditioned outlet for discharging conditioned air into a room,
at least one fan for moving air from said inlet to said at least one air conditioned outlet,
an air to air heat exchanger having a plurality of first channels, each of the first channels being defined by a respective pair of adjacent walls having first and second opposite ends respectively defining first and second openings through which said air flows, a plurality of second channels, each of the second channels being closed at a first end adjacent said first channel openings and open at a second end adjacent said first channel openings, wherein each of said second channels are formed between the walls of a pair of adjacent ones of said first channels, and evaporative cooling means in each of said second channels wherein a portion of said air flow exiting said first channels is diverted into said second channels to be cooled by said evaporative cooling means thereby cooling said air flow in said first channels by heat exchange across said walls,
an exhaust outlet in said housing for discharging exhaust air from said second channels,
a vapour compression-type cooling system having:
an evaporator coil through which air from said air to air heat exchanger passes for further cooling,
a condenser coil through which said exhaust air from said second channels passes, and
a control system that at least senses the temperature of the room air and controls the operation of said air-conditioner to operate only said air to air heat exchanger when the room air temperature is below a pre-determined amount and operates both said air to air heat exchanger and vapour compression-type cooling system when the room air temperature is above said pre-determined amount.

8. An air-conditioner according to claim 7 further comprising a first air inlet receiving outside air and a second air inlet receiving air from the air conditioned room, said air from said first and second inlets being mixed prior to entering said air to air heat exchanger.

9. An air-conditioner according to claim 8 further comprising air flow control means on both said first and second inlets to at least partially open or close to control air flow through said inlets, said air flow control means being operated by said control system.

10. An air-conditioner according to claim 9 wherein said air flow control means on said second air inlet is closed when only said air to air heat exchanger is operating.

11. An air-conditioner according to claim 9 wherein said air flow control means on said first air inlet is partially opened to allow between 20 to 30 percent of total air flow through said first air inlet, and said air flow control means on said second air inlet is partially opened to allow the balance of the total air flow through said second air inlet.

12. An air-conditioner according to claim 7 further comprising a water tank for supplying water to said air to air heat exchanger.

13. An air-conditioner according to claim 12 further comprising a condensate collector on said evaporator coil that drains into said water tank.

14. An air-conditioner according to claim 12 wherein said evaporative cooling means of said air to air heat exchanger comprises a plurality of wicking sheets against each wall within each of said second channels and wherein water from said water tank is supplied to the base of each said wicking sheet.

15. An air-conditioner according to claim 14 further comprising a secondary water supply that directs water from said water tank to the top of each said wicking sheet to provide a flushing flow down each said sheet.

16. An air-conditioner according to claim 7 further comprising air flow control means on said at least one air conditioned outlet to restrict air flow therethrough to control the rate of said diverted air flow through said second channels.

17. An air-conditioner according to claim 7 further comprising at least one fan in said exhaust outlet for discharging said exhaust air from said second channels.

* * * * *